(12) United States Patent
Sato et al.

(10) Patent No.: US 12,269,614 B2
(45) Date of Patent: Apr. 8, 2025

(54) METHOD OF PRODUCING STRUCTURE

(71) Applicant: SUBARU CORPORATION, Tokyo (JP)

(72) Inventors: Yoichi Sato, Tokyo (JP); Kazuma Ashizawa, Tokyo (JP); Yutaka Yamagishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/441,781

(22) Filed: Feb. 14, 2024

(65) Prior Publication Data
US 2024/0278937 A1  Aug. 22, 2024

(30) Foreign Application Priority Data

Feb. 21, 2023 (JP) ................................ 2023-025102

(51) Int. Cl.
*B64F 5/10* (2017.01)
*B64F 5/60* (2017.01)

(52) U.S. Cl.
CPC .............. *B64F 5/10* (2017.01); *B64F 5/60* (2017.01); *G05B 2219/35017* (2013.01)

(58) Field of Classification Search
CPC ..... B64F 5/10; B64F 5/00; B64F 5/60; G05B 2219/35017; G05B 2219/35; G05B 2219/30; G05B 2219/00
See application file for complete search history.

(56) References Cited

U.S. PATENT DOCUMENTS

| | | | |
|---|---|---|---|
| 8,479,394 B2 | 7/2013 | Glazebrook | |
| 10,275,565 B2* | 4/2019 | Vasquez | .................. B64F 5/10 |
| 10,311,164 B2* | 6/2019 | Fricero | .................. B64C 1/069 |

(Continued)

FOREIGN PATENT DOCUMENTS

| | | |
|---|---|---|
| CN | 101272956 A | 9/2008 |
| JP | 2006-051557 A | 2/2006 |

(Continued)

OTHER PUBLICATIONS

Extended European Search Report dated Aug. 12, 2024 for European Patent Application No. 24152782.9 (7 pages).

*Primary Examiner* — Lawrence Averick
(74) *Attorney, Agent, or Firm* — Smith, Gambrell & Russell, LLP

(57) ABSTRACT

A method of producing a structure including a first component, having a first surface, and a second component, having second and third surfaces includes: measuring profiles of the second and third surfaces; measuring profiles of fourth and fifth surfaces of subcomponents; assembling the first component by coupling the subcomponents with adjustment; recording data representing the adjustment; estimating a changed profile of the second surface in case of coupling the third surface to the first surface; determining a coupling position of the third surface to the first surface; and coupling the third surface to the first surface at the determined coupling position. The predetermined contour degree is required for the second surface. The first surface is formed by the fourth surfaces. The fifth surfaces influence a profile of the first surface. The changed profile is estimated based on the profiles of the second to fifth surfaces and the recorded data.

20 Claims, 7 Drawing Sheets

(56) References Cited

U.S. PATENT DOCUMENTS

| | | | |
|---|---|---|---|
| 10,450,053 B2 | 10/2019 | Doyle et al. | |
| 11,188,688 B2* | 11/2021 | Vasquez | G06F 30/15 |
| 11,440,635 B1* | 9/2022 | Kandavalli | B64F 5/10 |
| 2014/0288895 A1* | 9/2014 | Fricero | B64C 1/069 |
| | | | 703/1 |
| 2017/0132355 A1* | 5/2017 | Vasquez | B64C 1/26 |
| 2019/0205501 A1* | 7/2019 | Vasquez | G06F 30/15 |

FOREIGN PATENT DOCUMENTS

| | | |
|---|---|---|
| JP | 2014-129012 A | 7/2014 |
| JP | 2018-051751 A | 4/2018 |

* cited by examiner

METHOD OF PRODUCING STRUCTURE

CROSS REFERENCES TO RELATED APPLICATIONS

This application is based upon and claims the benefit of priority from Japanese Patent Application No. 2023-025102, filed on Feb. 21, 2023; the entire contents of which are incorporated herein by reference.

FIELD

Implementations described herein relate generally to a method of producing a structure.

BACKGROUND

An aircraft and an aircraft part are produced by assembling components. In order to allow smoothly coupling components to each other, an interface portion of each component is required to have a higher degree of contour than that in another portion. The characteristic of a component that requires management of variation in a degree of contour or the like is called a key characteristic. The meaning of the key characteristic is also defined in standards, such as JIS (Japanese Industrial Standards), as a term for quality control.

In many cases, a component having a key characteristic in a degree of contour is produced by assembling subcomponents. Since profiles and a shape of each subcomponent usually have production errors, there are a case where a load is applied to deform a subcomponent and a case where a subcomponent is positioned with slightly shifting the subcomponent in order to couple subcomponents to each other. As a result, an interface portion of a component having a key characteristic may deviate from contour degree requirements.

A profile at an interface portion of a component having a key characteristic regarding a degree of contour is inspected with a three-dimensional measuring apparatus. When a contour degree requirement is not met, a large-scale repair, such as producing and attaching a dedicated part, is required.

Accordingly, various techniques for coupling aircraft components to each other with high precision have been proposed (for example, refer to Japanese Patent Application Publication JP2006-051557 A and Japanese Patent Application Publication JP2018-051751 A).

An object of the present invention is to ensure that a portion of a component having a key characteristic does not deviate from contour degree requirements in assembling a structure, such as an aircraft or an aircraft part.

SUMMARY

In general, according to one implementation, a method of producing a structure including a first component and a second component is provided. The first component has a first surface. The first component includes subcomponents. The second component has a second surface and a third surface. The predetermined contour degree is required for the second surface. The structure is assembled by coupling the third surface of the second component to the first surface of the first component after assembling the first component by coupling the subcomponents to each other. The structure is an aircraft, an aircraft component, a spacecraft or a spacecraft component. The method includes: measuring profiles of the second and third surfaces of the second component which has not been coupled to the first component; measuring a profile of at least one fourth surface, by which the first surface is to be formed, of the subcomponents which has not been coupled to each other; measuring a profile of at least one fifth surface of the subcomponents which has not been coupled to each other; assembling the first component by coupling the subcomponents with adjustment including at least one of load application and position adjustment; recording data representing the adjustment; estimating a changed profile of the second surface of the second component in case of coupling the third surface of the second component to the first surface of the assembled first component; determining a coupling position of the third surface of the second component to the first surface of the first component based on the estimated changed profile of the second surface; and coupling the third surface of the second component to the first surface of the first component at the determined coupling position. The at least one fifth surface is determined as a surface which influences a profile of the first surface of the first component after coupling the subcomponents. The changed profile of the second surface is estimated based on the measured profiles of the second to fifth surfaces and the recorded data representing the adjustment. The changed profile of the second surface is estimated before coupling the second component to the assembled first component.

DETAILED DESCRIPTION

A method of producing a structure according to implementations of the present invention will be described with reference to accompanying drawings.

Figure 1:
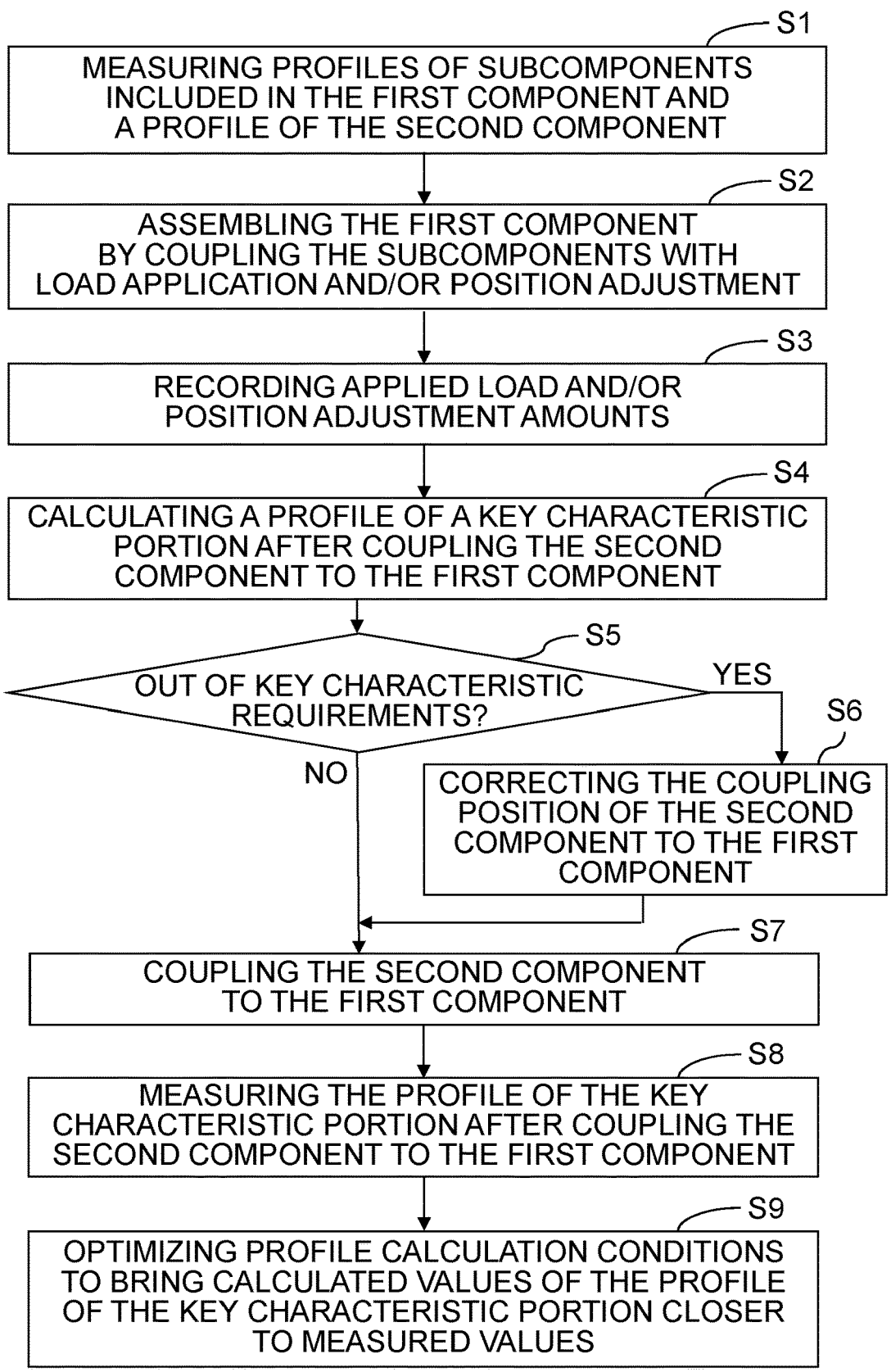
FIG. 1 is a flowchart for explaining a flow of a method of producing a structure according to an implementation of the present invention.

FIG. 1 is a flowchart for explaining a flow of a method of producing a structure according to an implementation of the present invention.

The method of producing a structure shown in FIG. 1 can be adopted in a case where the structure including a first component having a first surface, and a second component having a second surface, for which a predetermined degree of contour is required, and a third surface is to be produced by assembling the first component by coupling subcomponents, and subsequently coupling the third surface of the second component to the first surface of the first component. That is, the structure is produced by assembling at least the first component and the second component, and the first component is produced by assembling the subcomponents. The second component has the second surface that is required not to deviate from contour degree requirements, i.e., has a key characteristic for a degree of contour. Meanwhile, the third surface of the second component is coupled to the first surface of the first component.

Typical examples of such a structure include an aircraft, an aircraft component, a spacecraft, such as a rocket, and a component of a spacecraft. Therefore, the producing method shown in FIG. 1 can be adopted as a method of producing a structure consisting of an aircraft, an aircraft component, a spacecraft, or a spacecraft component. The aircraft is not limited to a fixed wing aircraft, but may be a rotorcraft, such as a helicopter, a multicopter, a drone or a flying car.

Although a case where the structure to be produced by the producing method shown in FIG. 1 is a center wing of a fixed-wing aircraft will be described hereinafter as a main specific example, the structure to be produced may be an aircraft part, such as a wing structure, produced by coupling parts, such as panels, spars, ribs, stringers, stiffeners and frames, or may be a complete fixed-wing aircraft produced by coupling wing structures, such as main wings, to a fuselage and/or coupling fuselages to each other.

Figure 2:
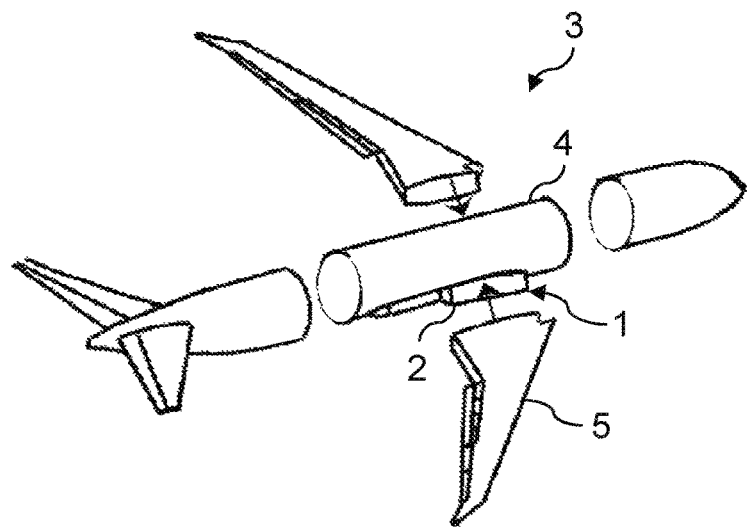
FIG. 2 is an exploded perspective view of an aircraft including a center wing which is an example of a structure to be produced by the producing method shown in FIG. 1.

FIG. 2 is an exploded perspective view of an aircraft 3 including a center wing 2 which is an example of a structure 1 to be produced by the producing method shown in FIG. 1.

As shown in FIG. 2, the aircraft 3 is typically manufactured by coupling left and right main wings 5 to a fuselage 4 composed of coupled components including tails. A wing structure called the center wing 2 is disposed between the left and right main wings 5. That is, the center wing 2 is coupled to the fuselage 4, and then the left and right main wings 5 are coupled to the center wing 2.

Figure 3:
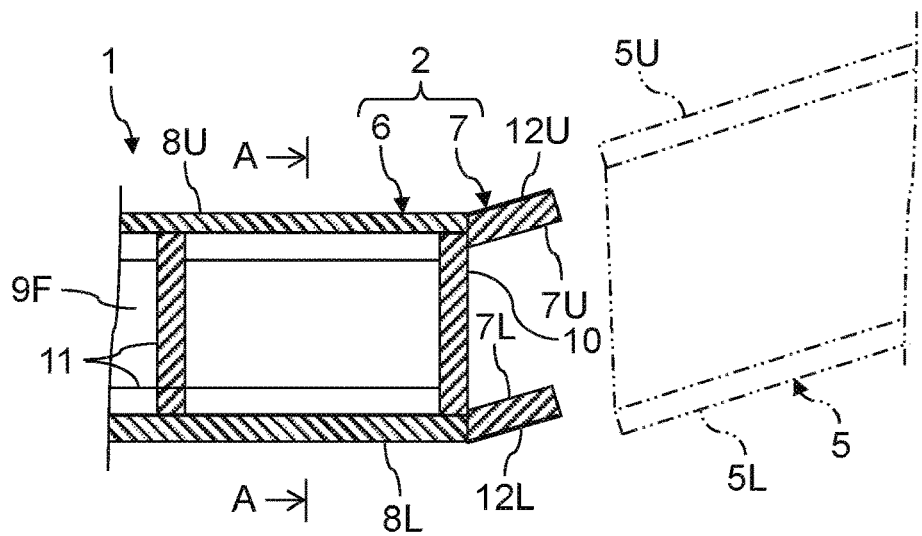
FIG. 3 is a view for explaining a simplified structure example of the center wing shown in FIG. 2.
Figure 4:
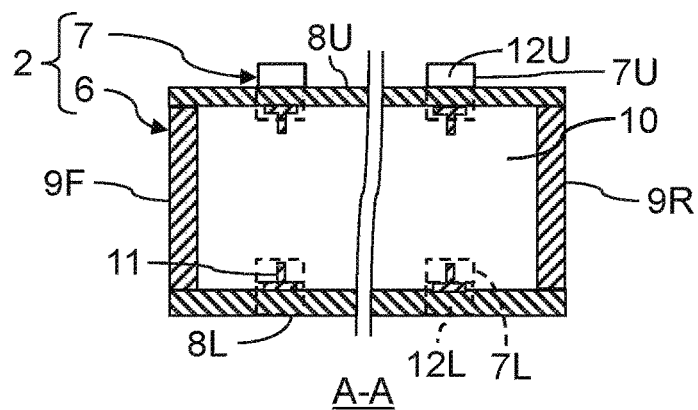
FIG. 4 is a cross-sectional view of the center wing at the position A-A shown in FIG. 3.

FIG. 3 is a view for explaining a simplified structure example of the center wing 2 shown in FIG. 2. FIG. 4 is a cross-sectional view of the center wing 2 at the position A-A shown in FIG. 3.

As shown in FIG. 3, the center wing 2 typically has structure in which many right and left wing-fuselage coupling fittings 7 are coupled to a center wing main body 6. The wing-fuselage coupling fittings 7 are for coupling the left and right main wings 5 to the fuselage 4 via the center wing 2. Each of the left and right main wings 5 has an upper panel 5U and a lower panel 5L. Therefore, the wing-fuselage coupling fittings 7 include upper wing-fuselage coupling fittings 7U for coupling the upper panels 5U and lower wing-fuselage coupling fittings 7L for coupling the lower panels 5L.

On the other hand, the center wing main body 6 typically has box structure in which an upper panel 8U, a lower panel 8L, a front spar 9F, a rear spar 9R, and outer ribs 10 having webs forming left and right wall surfaces respectively are coupled, as shown in FIGS. 3 and 4. In addition to the front spar 9F, the rear spar 9R, and the left and right ribs 10, a large number of reinforcing members 11, such as stringers and other ribs, are coupled to the upper panel 8U and the lower panel 8L. That is, the reinforcing members 11 are fixed inside the upper panel 8U and the lower panel 8L, and thereby the upper panel 8U and the lower panel 8L are reinforced by the reinforcing members 11.

In case of a fixed-wing aircraft, each reinforcing member 11 which has elongated structure and is disposed so that the length direction of the reinforcing member 11 may almost be the length direction of the wing is generally called a stringer. Meanwhile, each reinforcing member 11 disposed so that the length direction of the reinforcing member 11 may almost be the width direction of the wing is called a rib. A typical rib has plate-like structure having webs surrounded by flanges.

FIGS. 3 and 4 show an example in which the upper wing-fuselage coupling fittings 7U and the lower wing-fuselage coupling fittings 7L are disposed at positions opposite to the reinforcing members 11, such as stringers, so that each of the left and right ribs 10, disposed on the outermost side, in order to close the center wing main body 6 may be sandwiched between the reinforcing member 11 and each of the upper wing-fuselage coupling fittings 7U and the lower wing-fuselage coupling fittings 7L. That is, each wing-fuselage coupling fitting 7 can be intermittently attached to each position spanning the surface of one of the ribs 10 reinforced with the reinforcing members 11 and the upper panel 8U or the lower panel 8L. In this case, a large number of the wing-fuselage coupling fittings 7 are coupled on the upper, lower, left and right sides of the center wing main body 6.

Figure 5:
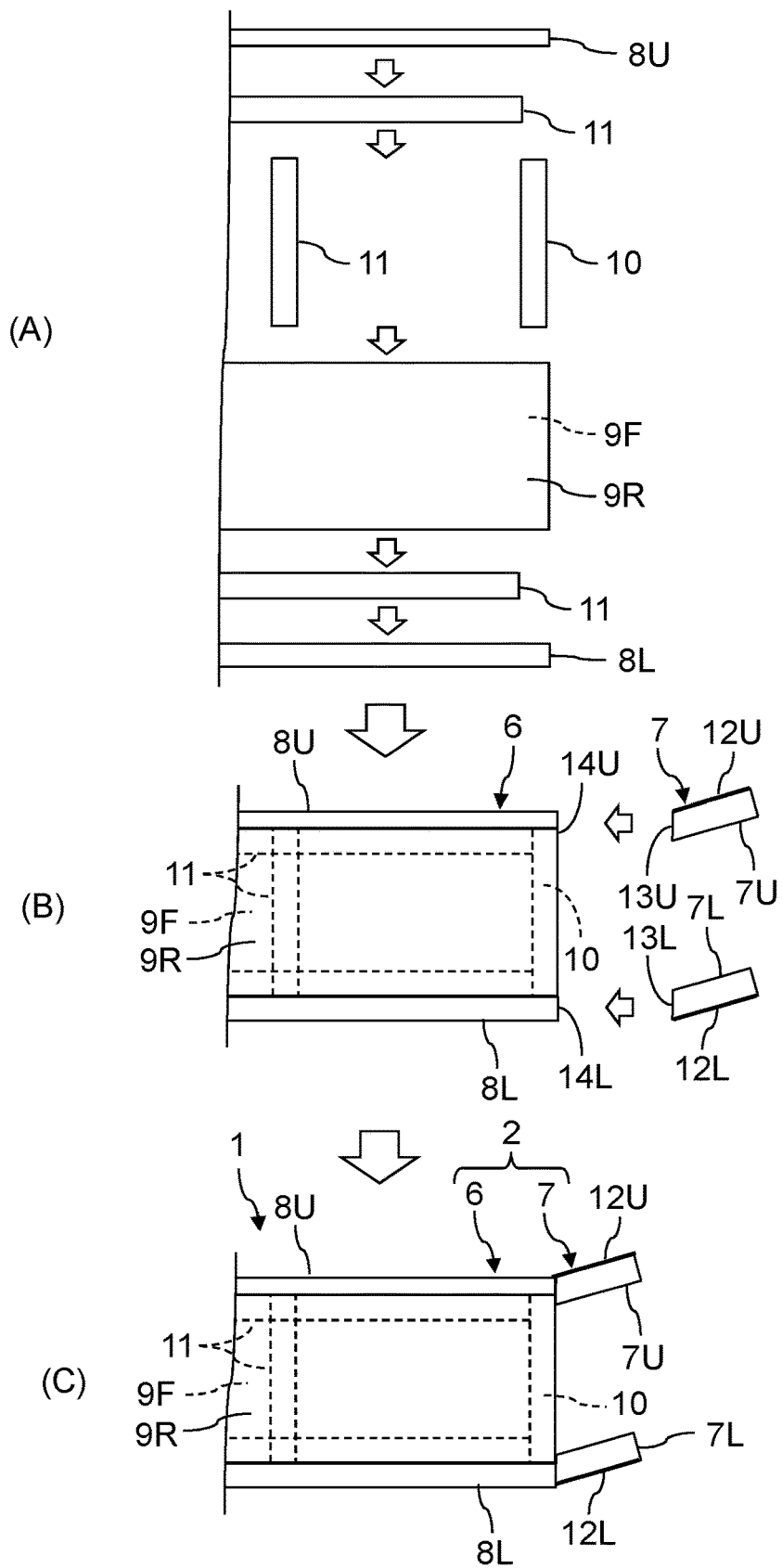
FIG. 5 is a view for explaining an assembly order of parts included in the center wing shown in FIG. 2.

FIG. 5 is a view for explaining an assembly order of parts included in the center wing 2 shown in FIG. 2.

As shown in (A) of FIG. 5, the center wing main body 6 can be assembled by coupling parts including the upper panel 8U, the lower panel 8L, the front spar 9F, the rear spar 9R, the left and right ribs 10, and the reinforcing members 11, such as stringers and inner ribs. Next, as shown in (B) of FIG. 5, the upper wing-fuselage coupling fittings 7U and the lower wing-fuselage coupling fittings 7L are coupled to the center wing main body 6. Thereby, the center wing 2 can be assembled as shown in (C) of FIG. 5.

In most cases, each of the parts including the upper panel 8U, the lower panel 8L, the front spar 9F, the rear spar 9R, the ribs 10 and the reinforcing members 11 is made of a metal, such as aluminum or titanium, or an FRP (fiber reinforced plastic), such as CFRP (carbon fiber reinforced plastic) or GFRP (glass fiber reinforced plastic), which is also called a composite material.

Although a coupling method using fasteners, such as bolts or rivets, is mostly adopted as a method of coupling the produced parts including the upper panel 8U, the lower panel 8L, the front spar 9F, the rear spar 9R, the ribs 10 and the reinforcing members 11 in case of assembling the center wing main body 6 by coupling the produced parts as shown in FIG. 5, a coupling method by welding or with adhesive may also be adopted.

The upper surface 12U of each upper wing-fuselage coupling fitting 7U and the lower surface 12L of each lower wing-fuselage coupling fitting 7L serve as surfaces for surface contact with the upper panel 5U and the lower panel 5L of the main wing 5, respectively. Therefore, the upper surfaces 12U of the upper wing-fuselage coupling fittings 7U and the lower surfaces 12L of the lower wing-fuselage coupling fittings 7L are required to have predetermined contour degrees not only before the assembly but also after the assembly unlike other surfaces of the center wing 2. That is, the upper surfaces 12U of the upper wing-fuselage coupling fittings 7U and the lower surfaces 12L of the lower wing-fuselage coupling fittings 7L each has a key characteristic regarding a degree of contour.

Therefore, the center wing main body 6 included in the center wing 2 corresponds to the first component of the structure 1 which is assembled by coupling subcomponents including the upper panel 8U, the lower panel 8L, the front spar 9F, the rear spar 9R, the left and right ribs 10 and the reinforcing members 11. On the other hand, each of the upper wing-fuselage coupling fittings 7U included in the center wing 2 corresponds to the second component having the upper surface 12U as the second surface for which a predetermined contour degree is required. Similarly, each of the lower wing-fuselage coupling fittings 7L included in the center wing 2 also corresponds to the second component having the lower surface 12L as the second surface for which a predetermined contour degree is required.

In addition, joint surfaces 14U of the center wing main body 6 respectively coupled to end surfaces 13U of the upper wing-fuselage coupling fittings 7U each corresponding to the second component, and joint surfaces 14L of the center wing main body 6 respectively coupled to end surfaces 13L of the lower wing-fuselage coupling fittings 7L each corresponding to the second component, as shown in (B) of FIG. 5, each corresponds to the first surface of the first component for coupling the second component.

On the other hand, the end surfaces 13U of the upper wing-fuselage coupling fittings 7U respectively coupled to the upper joint surfaces 14U of the center wing main body 6 corresponding to the first component, and the end surfaces 13L of the lower wing-fuselage coupling fittings 7L respectively coupled to the lower joint surfaces 14L of the center wing main body 6 corresponding to the first component each corresponds to the third surface of the second component coupled to the first surface of the first component.

Accordingly, the method of producing the structure 1 will be described with reference to FIG. 1 with considering the center wing 2 as an example of the structure 1 to be produced; the center wing main body 6 as an example of the first component; the upper panel 8U, the lower panel 8L, the front spar 9F, the rear spar 9R, the left and right ribs 10 and the reinforcing members 11 as examples of the subcomponents of the first component; the upper wing-fuselage coupling fittings 7U and the lower wing-fuselage coupling fittings 7L as examples of the second component; the joint surfaces 14U of the center wing main body 6, to which the upper wing-fuselage coupling fittings 7U are coupled respectively, and the joint surfaces 14L of the center wing main body 6, to which the lower wing-fuselage coupling fittings 7L are coupled respectively, as examples of the first surface of the first component; the upper surfaces 12U of the upper wing-fuselage coupling fittings 7U and the lower surfaces 12L of the lower wing-fuselage coupling fittings 7L as examples of the second surface (key characteristic surface) of the second component having a key characteristic regarding a degree of contour; and the end surfaces 13U of the upper wing-fuselage coupling fittings 7U and the end surfaces 13L of the lower wing-fuselage coupling fittings 7L as examples of the third surface of the second component.

First, in step S1 of FIG. 1, profiles on surfaces of respective parts which dominantly influence a degree of contour of the second surface of the second component used as a key characteristic surface after the structure 1 is assembled are measured. The surfaces whose profiles dominantly influence the contour degree of the key characteristic surface include at least surfaces to form a boundary between the first component and the second component, in addition to the second surface of the second component which is the key characteristic surface itself.

When the second component consists of a single part, the surfaces to form the boundary between the first component and the second component consist of the third surface of the second component to be coupled to the first component, and a surface of at least one subcomponent, which has not been coupled, to form the first surface of the first component. Specifically, when the first surface of the first component is formed by a surface of a single subcomponent, the first surface is a fourth surface forming a part of the surface of the foregoing single subcomponent. On the other hand, when the first surface of the first component is formed by combining surfaces of multiple subcomponents, the first surface consists of fourth surfaces, which have not been combined, respectively forming parts of the surfaces of the foregoing subcomponents.

Each part included in the structure 1 has production error. In addition, each part deforms before and after the structure 1 is assembled. Therefore, a profile of at least one surface other than the first surface, the second surface and the third surface also influences the contour degree of the key characteristic surface. Accordingly, at least one fifth surface whose profile dominantly influences the profile of the key characteristic surface is previously determined from surfaces other than the second surface, the third surface and the fourth surface or surfaces forming the first surface since it is impractical to measure the profiles of all the surfaces of all the parts.

Figure 6:
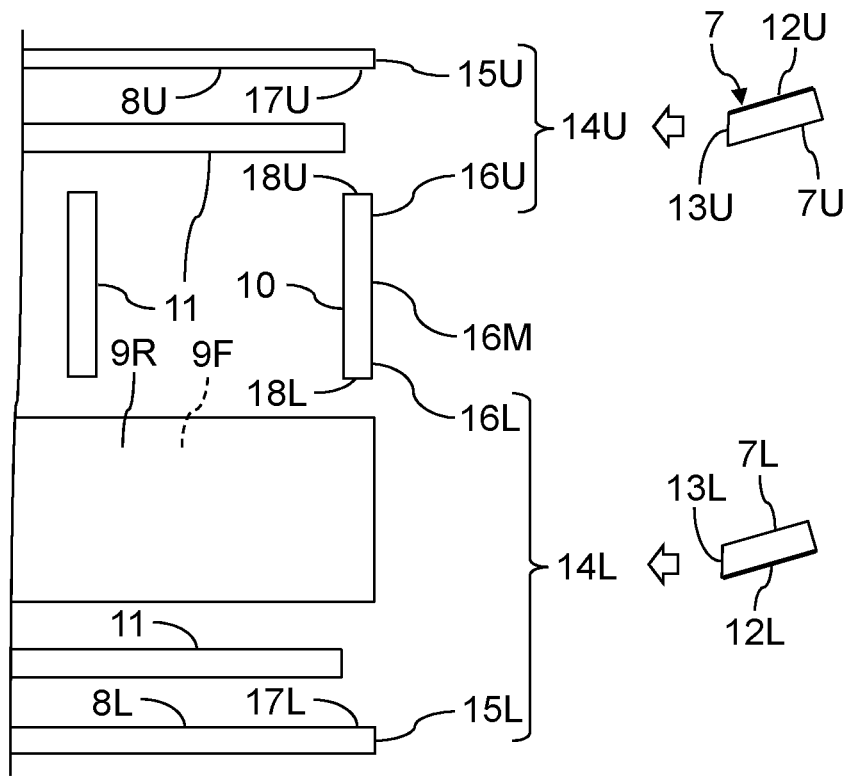
FIG. 6 shows an example of surfaces of parts whose profiles are considered to have non-negligible influences on the contour degrees of the upper surface of the upper wing-fuselage coupling fitting and the lower surface of the lower wing-fuselage coupling fitting which are the key characteristic surfaces, out of the parts included in the center wing main body shown in FIG. 3.

FIG. 6 shows an example of surfaces of parts whose profiles are considered to have non-negligible influences on the contour degrees of the upper surface 12U of the upper wing-fuselage coupling fitting 7U and the lower surface 12L of the lower wing-fuselage coupling fitting 7L which are the key characteristic surfaces, out of the parts included in the center wing main body 6 shown in FIG. 3.

When the end surface 13U of the upper wing-fuselage coupling fitting 7U, which is the third surface of the second component, is coupled to both the upper panel 8U and the rib 10 as shown in FIG. 3, the joint surface 14U of the center wing main body 6, which is the first surface of the first component, is a surface derived by combining an end surface 15U of the upper panel 8U, which is a subcomponent of the center wing main body 6, with an upper area 16U of a surface of the rib 10 as shown in FIG. 6. Similarly, when the end surface 13L of the lower wing-fuselage coupling fitting 7L, which is the third surface of the second component, is coupled to both the lower panel 8L and the rib 10, the joint surface 14L of the center wing main body 6, which is the first surface of the first component, is a surface derived by combining an end surface 15L of the lower panel 8L, which is a subcomponent of the center wing main body 6, with a lower area 16L of a surface of the rib 10 as shown in FIG. 6.

Therefore, the end surface 15U of the upper panel 8U and the upper area 16U of the surface of the rib 10 which are to form the joint surface 14U of the center wing main body 6 can be determined as the fourth surfaces whose profiles are measured. Similarly, the end surface 15L of the lower panel 8L and the lower area 16L of the surface of the rib 10 which are to form the joint surface 14L of the center wing main body 6 can also be determined as the fourth surfaces whose profiles are measured.

In addition, a portion of the lower surface 17U of the upper panel 8U to be joined to the rib 10 and a portion consisting of the end surface 18U of the rib 10 to be joined to the lower surface 17U of the upper panel 8U, as shown in FIG. 6, each indirectly has a non-negligible influence on the profile of the upper surface 12U of the upper wing-fuselage coupling fitting 7U, which is a key characteristic surface, since the profiles of these portions influence the profile of the joint surface 14U although these portions do not form the joint surface 14U. Similarly, a portion of the upper surface 17L of the lower panel 8L to be joined to the rib 10 and a portion consisting of the end surface 18L of the rib 10 to be joined to the upper surface 17L of the lower panel 8L each indirectly has a non-negligible influence on the profile of the lower surface 12L of the lower wing-fuselage coupling fitting 7L, which is a key characteristic surface, since the profiles of these portions influence the profile of the joint surface 14L although these portions do not form the joint surface 14L. In addition, an area 16M of the surface of the rib 10 that does not form the joint surface 14U with the upper wing-fuselage coupling fitting 7U nor the joint surface 14L with the lower wing-fuselage coupling fitting 7L is also considered to have non-negligible influences on the key characteristic surfaces similarly.

Therefore, at least the portion of the lower surface 17U of the upper panel 8U to be joined to the rib 10, the portion consisting of the end surface 18U of the rib 10 to be joined to the lower surface 17U of the upper panel 8U, the portion of the upper surface 17L of the lower panel 8L to be joined to the rib 10, the portion consisting of the end surface 18L of the rib 10 to be joined to the upper surface 17L of the lower panel 8L, and the area 16M of the surface of the rib 10 that does not correspond to the fourth surface can be determined as the fifth surfaces whose profiles are measured, each having an influence on the degree of contour of at least one of the key characteristic surfaces. As a matter of course, another surface or other surfaces of the subcomponents included in the center wing main body 6 may be added to the fifth surfaces whose profiles are measured.

Figure 7:
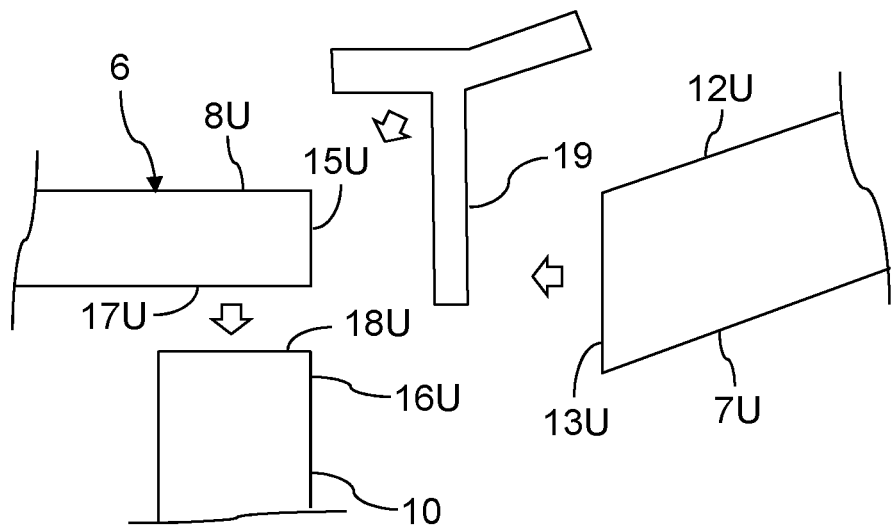
FIG. 7 shows an example in which a fitting is disposed between the center wing main body and the upper wing-fuselage coupling fitting shown in FIG. 3.

FIG. 7 shows an example in which a fitting 19 is disposed between the center wing main body 6 and the upper wing-fuselage coupling fitting 7U shown in FIG. 3.

In many cases, another part, such as the fitting 19, is actually disposed between the center wing main body 6 and the upper wing-fuselage coupling fitting 7U as shown in FIG. 7. In that case, a part, such as the fitting 19, attached to the center wing main body 6 can be considered as a subcomponent of the center wing main body 6, or can be considered as a component different from the center wing main body 6.

When the fitting 19 is considered as a subcomponent of the center wing main body 6, only a surface of the fitting 19 alone may form the joint surface 14U with the upper wing-fuselage coupling fitting 7U. In this case, the surface of the fitting 19 can be determined as the single fourth surface whose profile is measured, which forms the first surface of the first component. On the other hand, the end surface 15U of the upper panel 8U and the upper area 16U of the surface of the rib 10, which are to be joined to a surface of the fitting 19, are surfaces each influencing the profile of the upper surface 12U of the upper wing-fuselage coupling fitting 7U, which is the key characteristic surface, since the profiles of the end surface 15U and the upper area 16U influence the profile of the surface of the fitting 19 forming the first surface. Therefore, the end surface 15U of the upper panel 8U and the upper area 16U of the surface of the rib 10 can be determined as the fifth surfaces of the subcomponents whose profiles are measured, included in the first component.

Conversely, when the fitting 19 is considered as a component different from the center wing main body 6, the joint surface 14U for coupling the end surface 13U of the upper wing-fuselage coupling fitting 7U indirectly with the fitting 19 interposed therebetween is formed by the end surface 15U of the upper panel 8U and the upper area 16U of the surface of the rib 10 as described with reference to FIG. 6. Meanwhile, the profile of the fitting 19 has a non-negligible influence on the profile of the upper surface 12U of the upper wing-fuselage coupling fitting 7U, which is the key characteristic surface. Therefore, the fitting 19 can be determined as a third component, and profiles of main surfaces of the fitting 19 may be measured.

This also applies between the center wing main body 6 and the lower wing-fuselage coupling fitting 7L. Hereinafter, an example case will be described on the premise that a part, such as the fitting 19, is regarded as a component different from the center wing main body 6.

The respective profiles of the second surface, the third surface, the fourth surface and the fifth surface to be measured can be measured with a known three-dimensional measuring machine. A typical contact-type three-dimensional measuring machine measures a surface profile by bringing a probe into contact with an object to be measured. On the other hand, a typical non-contact three-dimensional measuring machine measures a surface profile of an object to be measured by irradiation of light, such as a laser beam.

When the profiles of the second surface of the second component before the coupling, the third surface of the second component before the coupling, the fourth surface or the fourth surfaces, which are to form the first surface of the first component, out of the surfaces of the subcomponents before the coupling, the fifth surface or the fifth surfaces, which are determined as a surface or surfaces influencing the profile of the first surface of the first component after coupling the subcomponents, out of the surfaces of the subcomponents before the coupling are measured using a three-dimensional measuring apparatus, the contour shapes of the measured surfaces can be each acquired as point group data defined by three-dimensional spatial coordinates.

Next, in step S2, the first component is assembled by coupling the subcomponents. In a case of the center wing 2 shown in FIGS. 3 to 5, the subassembly of the center wing main body 6 is performed as illustrated in (A) of FIG. 5. Specifically, the center wing main body 6 is produced by coupling parts including the upper panel 8U, the lower panel 8L, the front spar 9F, the rear spar 9R, the ribs 10 and the reinforcing members 11.

When a large component, such as an aircraft part, is assembled by coupling subcomponents, the component cannot be assembled as planned due to production errors of the subcomponent in many cases unless adjustment, such as load application and positioning with position adjustment, is performed. Therefore, the first component is assembled with adjustment including at least one of load application to one or more subcomponents and position adjustment of one or more subcomponents.

Figure 8:
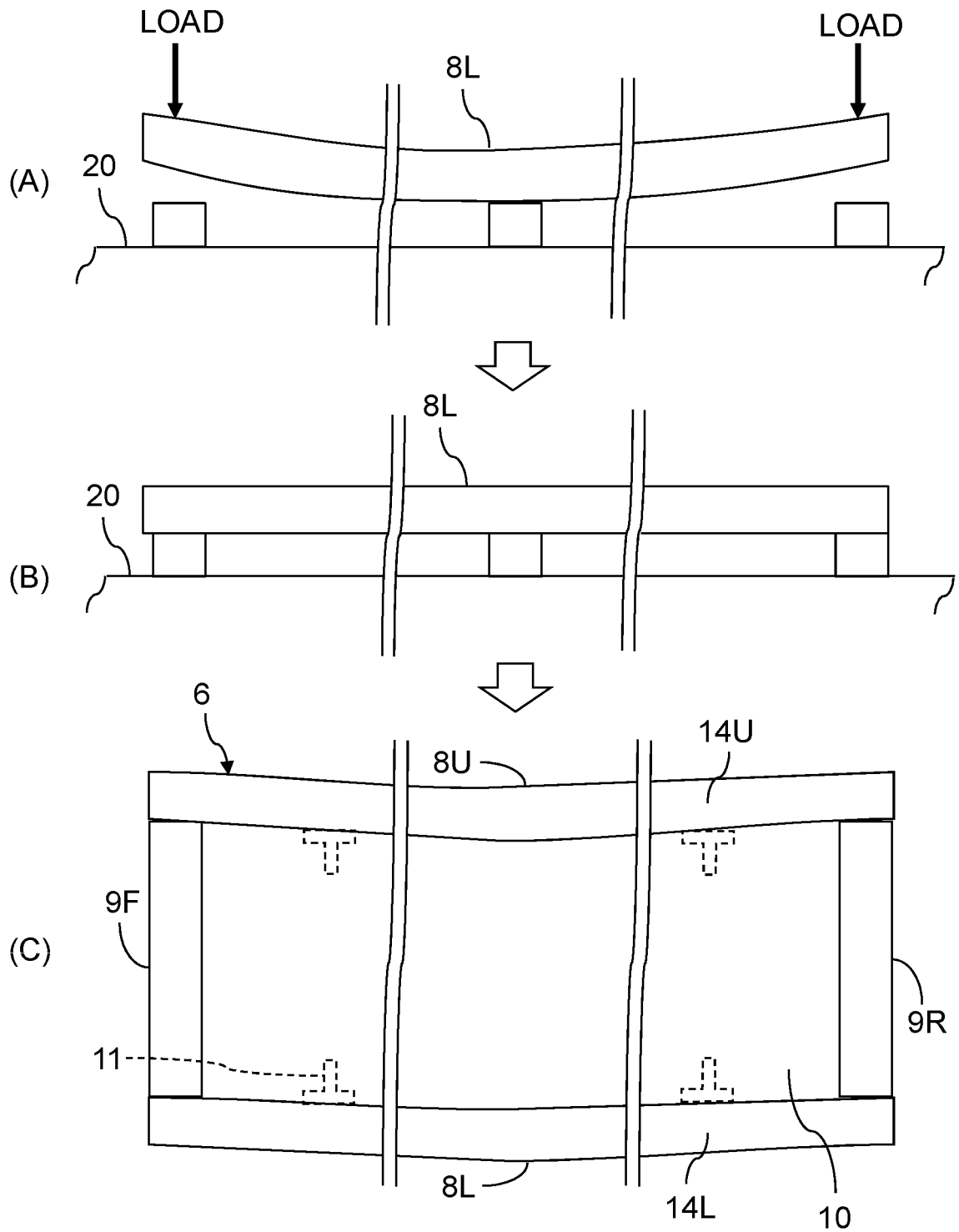
FIG. 8 shows an example of assembling the center wing main body shown in FIG. 3 with applying loads.

FIG. 8 shows an example of assembling the center wing main body 6 shown in FIG. 3 with applying loads.

The subassembly of the center wing main body 6 can be performed using an assembly jig 20. When the lower panel 8L is distorted as emphasized in (A) of FIG. 8, the lower panel 8L cannot be set in the assembly jig 20. In such a case, loads are applied so that the lower panel 8L can be set in the assembly jig 20. Although local loads are applied to the lower panel 8L at a plurality of positions in the example shown in (A) of FIG. 8, a pressure distribution may be applied to a specific area.

When appropriate loads are applied to appropriate positions according to an actual shape of the lower panel 8L, the lower panel 8L deforms, and thereby the lower panel 8L can be set in the assembly jig 20 as illustrated in (B) of FIG. 8. After that, parts including the front spar 9F, the rear spar 9R and the ribs 10 can be coupled to the lower panel 8L using necessary assembly jigs, and then the upper panel 8U can be coupled to the front spar 9F, the rear spar 9R and the ribs 10. Loads can also be applied to appropriate positions of the front spar 9F, the rear spar 9R, the ribs 10 and the upper panel 8U, as needed. Note that, one or more small reinforcing members, such as stringers, of the reinforcing members 11 may be fixed to the lower panel 8L and the upper panel 8U before setting the lower panel 8L and the upper panel 8U in the assembly jig 20.

The load application to one or more subcomponents can be performed by a known method. As a specific example, a load having a required magnitude can be applied to a desired position by placing a weight, tightening a belt, or operating a load application device having a rod which expands and contracts with a ball screw or the like.

After the subassembly of the center wing main body 6 is completed, the center wing main body 6 is removed from the assembly jig 20. At this time, the center wing main body 6 is deformed due to the internal stresses of the subcomponents as shown with emphasis in (C) of FIG. 8.

Figure 9:
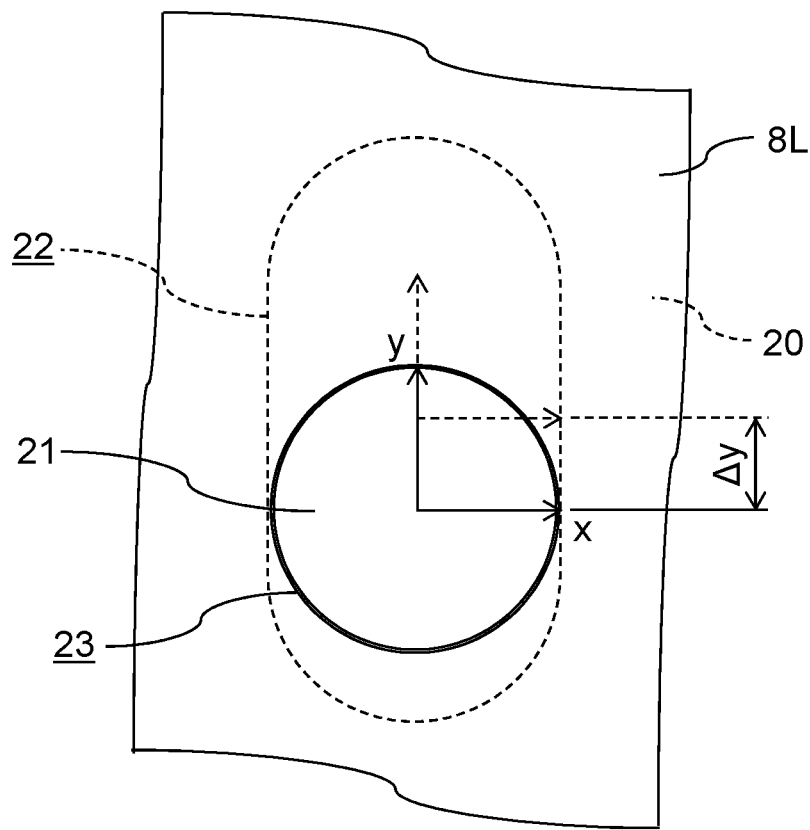
FIG. 9 shows an example of assembling the center wing main body shown in FIG. 3 with positioning including position adjustment.

FIG. 9 shows an example of assembling the center wing main body 6 shown in FIG. 3 with positioning including position adjustment.

Generally, when a part is set on a jig, two pins are often used to position the part on the jig. When the part is large, dimensional errors become large and therefore a hole in the jig into which one of the pins is inserted is needed to be a long hole.

Therefore, when the lower panel 8L, which is a large subcomponent, is set by inserting a positioning pin 21 into a long hole 22 of the assembly jig 20, the position of the lower panel 8L changes depending on a position at which the positioning pin 21 inserted into a positioning through hole 23 of the lower panel 8L is actually inserted into the long hole 22.

As a specific example, when a two-dimensional coordinate system in which the direction perpendicular to the length direction of the long hole 22 is the x-axis while the length direction of the long hole 22 is the y-axis is defined, the center position of the positioning through hole 23 of the lower panel 8L into which the positioning pin 21 is inserted is shifted from an original position by Δy in the length direction of the long hole 22 relative to the assembly jig 20 as in the example shown in FIG. 9. In addition, a shift amount in an angle of the lower panel 8L relative to the assembly jig 20 can also be obtained by checking an error in a slope of a straight line connecting the position of the positioning pin 21 inserted into the long hole 22 with a position of the other positioning pin inserted into both a circular reference through hole of the assembly jig 20 and the other positioning through hole of the lower panel 8L.

In this way, when the lower panel 8L is positioned by inserting the positioning pin 21 into the long hole 22 of the assembly jig 20, the position of the lower panel 8L changes from a planned position. That is, the position of the lower panel 8L is adjusted. When positioning including similar position adjustment is performed for another subcomponent, a position of that subcomponent also changes from a planned position.

Figure 10:
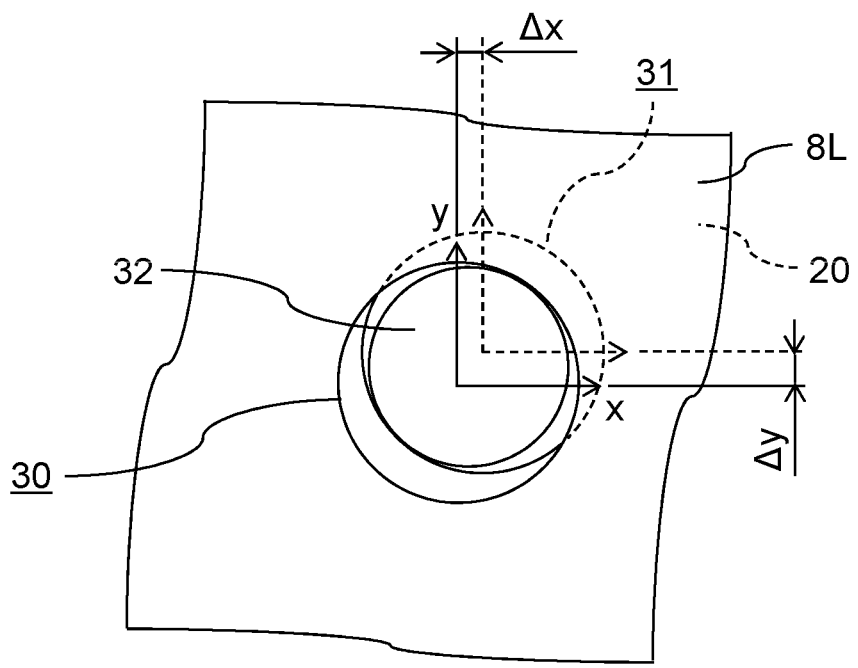
FIG. 10 shows another example of assembling the center wing main body shown in FIG. 3 with positioning including position adjustment.

FIG. 10 shows another example of assembling the center wing main body 6 shown in FIG. 3 with positioning including position adjustment.

When a circular positioning through hole 30 formed in the lower panel 8L and a circular positioning hole 31 formed in the assembly jig 20 are shifted from each other as illustrated in FIG. 10, it is not possible to insert a pin having an original diameter. In such a case, a positioning pin 32 having a small diameter that can be inserted into both the circular positioning through hole 30 and the circular positioning hole 31 is often inserted.

In this case, in a two-dimensional coordinate space in which the x-axis and y-axis are orthogonal to each other, the center position of the positioning through hole 30 of the lower panel 8L is shifted from the original position, which is the center position of the positioning hole 31 of the assembly jig 20, by Δx in the x-axis direction and Δy in the y-axis direction. In addition, a shift amount of the angle of the lower panel 8L relative to the assembly jig 20 can also be obtained by checking a shift amount of a position of another positioning reference hole formed in the lower panel 8L.

Note that, after the positioning is once completed by inserting a positioning pin having an original diameter into both the positioning through hole 30 formed in the lower panel 8L and the positioning hole 31 formed in the assembly jig 20, the positioning pin having the original diameter is removed as the assembly work progresses, and subsequently the positioning pin 32 having the small diameter is inserted with shifting the center position of the positioning through hole 30 formed in the lower panel 8L from the center position of the positioning hole 31 formed in the assembly jig 20 in a case where it is necessary to proceed with the assembly work or in a case where it is preferable from the viewpoint of facilitating the assembly work.

This also applies to positioning including position adjustment of another subcomponent. The positional adjustment of each subcomponent is not limited to the examples shown in FIGS. 9 and 10, but may be performed as many times as desired in desired directions based on shapes and relative positions of assembly jigs and another adjacent subcomponent. Accordingly, the first component can be assembled while adjusting a position of each subcomponent in three-dimensional directions.

Next, in step S3, data representing adjustment made to one or more subcomponents in the subassembly of the first component are recorded. Specifically, when loads have been applied to a subcomponent according to an actual shape of the subcomponent, load data representing the loads applied to the subcomponent are recorded, and when positioning has been performed to correct a position of a subcomponent according to an actual shape of the subcomponent, data representing an amount of the positional adjustment of the subcomponent are recorded.

The loads applied to a subcomponent can be expressed as vectors or pressure distributions representing positions, directions, and magnitudes of the applied loads. On the other hand, an amount of position adjustment of a subcomponent can be expressed as shift amounts of distances in three-dimensional directions. Note that, an amount of position adjustment of a subcomponent may be expressed including a shift amount of an angle.

Next, in step S4, the profile of the second surface of the second component in a case where the third surface of the second component is coupled to the first surface of the first component after the subassembly is calculated based on the profiles of the second to fifth surfaces measured in step S1 before the subassembly of the first component, and the data, recorded in step S3, representing adjustment made to one or more subcomponents in the subassembly of the first component. That is, the profile of the second surface of the second component having the key characteristic for the contour degree is predicted before coupling the second component to the first surface of the first component.

The profile of the second surface of the second component having the key characteristic can be calculated by analysis using an FEM (finite element method). Specifically, the profile of the first surface changed due to the deformation of the first component can be three-dimensionally calculated by simulating, using FEM analysis, an amount of the deformation of the first component due to internal stress and shear force as well as positional and angular shifts caused by adjustment, such as load application and positional adjustment, performed in the subassembly of the first component. Then, the profile of the second surface of the second component in a case where the second component is coupled to the first surface of the deformed first component can be also calculated.

In this case, pieces of input data into the FEM analysis includes: design information, including the shapes, of the subcomponents included in the first component; design information, including the shape, of the second component; the measured data of the three-dimensional profiles of the second to fifth surfaces; and data on the adjustment, such as load application and position adjustment, performed to one or more subcomponents during the subassembly of the first component. On the other hand, data output as a result of the FEM analysis are three-dimensional point group data representing the profile of the second surface of the second component, which has the key characteristic regarding the contour degree. In the FEM analysis, the measured data of the three-dimensional profiles of the second to fifth surfaces are used as correction data for the design information, including the shapes, of the subcomponents included in the first component and the design information, including the shape, of the second component.

Therefore, the more the number of the fifth surfaces each influencing the profile of the second surface of the second component having the key characteristic is, i.e., the more the number of profile measurement points on separated parts is, the more the accuracy of the FEM analysis improves, and thereby the more the prediction accuracy of the profile of the second surface of the second component also improves. Accordingly, it is appropriate to determine the fifth surfaces, of which profiles are to be measured at the single part stage, so as to cover a sufficient range so that the profile of the second surface of the second component can be calculated with sufficient accuracy. The fifth surfaces can be determined by simulation or theoretically based on design information.

As a matter of course, when the second component may be deformed due to various factors, an amount of deformation of the second component may also be simulated by FEM analysis. In that case, a profile of at least one surface of the second component, which is other than the second and third surfaces, and considered to influence the profile of the second surface having the key characteristic, may be measured in step S1, and added to the input data for the FEM analysis.

In a case of the center wing 2 illustrated in FIGS. 3 to 6, the profiles of the deformed joint surfaces 14U of the center wing main body 6 to which the upper wing-fuselage coupling fittings 7U are to be respectively coupled, and the profiles of the deformed joint surfaces 14L of the center wing main body 6 to which the lower wing-fuselage coupling fittings 7L are to be respectively coupled can be each calculated by FEM analysis. Thereby, the profiles of the upper surfaces 12U of the upper wing-fuselage coupling fittings 7U in a case where the upper wing-fuselage coupling fittings 7U are respectively coupled to the deformed joint surfaces 14U of the center wing main body 6, and the profiles of the lower surfaces 12L of the lower wing-fuselage coupling fittings 7L in a case where the lower wing-fuselage coupling fittings 7L are respectively coupled to the deformed joint surfaces 14L of the center wing main body 6 can also be calculated geometrically.

Note that, if the profiles of the joint surfaces 14U of the center wing main body 6 to be respectively coupled to the end surfaces 13U of the upper wing-fuselage coupling fittings 7U, and the profiles of the joint surfaces 14L of the center wing main body 6 to be respectively coupled to the end surfaces 13L of the lower wing-fuselage coupling fittings 7L are decided to be measured using a three-dimensional measuring machine, it is necessary to interrupt the assembly work of the center wing 2 for the three-dimensional measurement, which not only increases the time required to assemble the center wing 2 but also increases production cost.

In some cases, the profiles of the joint surfaces 14U of the center wing main body 6 to be respectively coupled to the end surfaces 13U of the upper wing-fuselage coupling fittings 7U, and the profiles of the joint surfaces 14L of the center wing main body 6 to be respectively coupled to the end surfaces 13L of the lower wing-fuselage coupling fittings 7L cannot be measured using a three-dimensional measuring machine due to interference with an assembly jig or the like.

Accordingly, the method of producing the center wing 2 shown in FIG. 5 supposes that the center wing 2 is assembled without measuring the profiles of the joint surfaces 14U of the center wing main body 6 to be respectively coupled to the end surfaces 13U of the upper wing-fuselage coupling fittings 7U, and the profiles of the joint surfaces 14L of the center wing main body 6 to be respectively coupled to the end surfaces 13L of the lower wing-fuselage coupling fittings 7L using a three-dimensional measuring machine.

Examples of a method of predicting the profile of the second surface of the second component having the key characteristic regarding the contour degree include a method using a neural network as well as the above-mentioned FEM analysis simulation. Specifically, the profile of the second surface of the second component may also be predicted by AI (artificial intelligence) that has been subjected to machine learning in advance.

In that case, the profiles of the upper surfaces 12U of the upper wing-fuselage coupling fittings 7U and the profiles of the lower surfaces 12L of the lower wing-fuselage coupling fittings 7L after assembling the center wing 2 may be directly predicted without predicting the profiles of the joint surfaces 14U of the center wing main body 6 to be respectively coupled to the end surfaces 13U of the upper wing-fuselage coupling fittings 7U, and the profiles of the joint surfaces 14L of the center wing main body 6 to be respectively coupled to the end surfaces 13L of the lower wing-fuselage coupling fittings 7L. That is, although the input data into the neural network is similar to the input data into the FEM analysis, the output data from the neural network can be the profiles of the upper surfaces 12U of the upper wing-fuselage coupling fittings 7U and the profiles of the lower surfaces 12L of the lower wing-fuselage coupling fittings 7L after assembling the center wing 2.

In case of using a neural network, it is necessary to obtain teacher data for the neural network by actually manufacturing a large number of the structures 1, such as the center wings 2, and/or a large number of FEM analysis simulations under different conditions, and then optimize parameters of the neural network using the teacher data so that calculation results by the neural network have sufficient accuracy. Accordingly, the method of predicting the profile of the second surface of the second component using a neural network is effective when the structure 1 is mass-produced. When the profile of the second surface of the second component is predicted using a neural network, calculation speed and calculation accuracy can be improved compared to a case where the profile of the second surface is predicted by FEM analysis.

Once the profile of the second surface of the second component has been predicted, it becomes possible to determine an appropriate coupling position of the third surface of the second component to the first surface of the first component based on the predicted profile of the second surface.

Specifically, in step S5, it can be determined whether the predicted profile of the second surface of the second component deviates from a requirement of the key characteristic regarding the degree of contour. Then, the coupling position of the third surface of the second component to the first surface of the first component can be determined so that the actual profile of the second surface of the second component may not deviate from the requirement of the key characteristic regarding the contour degree.

The requirement of the key characteristic regarding the contour degree can be expressed as a tolerance to an ideal profile of the second surface of the second component at the time of design, i.e., an acceptable error from nominal values, consisting of three-dimensional point group data, of the profile of the second surface. Accordingly, when three-dimensional point group data representing the predicted profile of the second surface are compared to the nominal values of the three-dimensional point group data obtained from design information of the structure 1, and there is at least one error larger than the acceptable error, it can be determined that the predicted profile of the second surface of the second component has deviated from the requirement of the key characteristic regarding the degree of contour.

Note that, another acceptable error stricter than the acceptable error of the second surface defined as the key characteristic requirement may be set for the determination in step S5. In other words, the determination in step S5 may be performed with setting a margin to the acceptable error of the contour degree of the second surface determined as the design information. In this case, it is possible to reliably detect a case where the profile of the second surface of the second component deviates from the requirement of the key characteristic regarding the degree of contour when the third surface of the second component is coupled to the first surface of the first component at a planned coupling position.

When it is determined that the profile of the second surface of the second component predicted in step S4 deviates from a predetermined degree of contour, the coupling position of the third surface of the second component to the first surface of the first component is corrected in step S6. Specifically, a correction amount of the coupling position of the third surface of the second component to the first surface of the first component, from an initially predetermined position is determined so that the profile of the second surface of the second component may satisfy the predetermined degree of contour in a case where the third surface of the second component is actually coupled to the first surface of the first component. Thereby, an actual coupling position of the second component is determined.

In a case of the center wing 2 illustrated in FIGS. 3 to 5, when it is determined that at least one of the predicted profiles of the upper surfaces 12U of the upper wing-fuselage coupling fittings 7U deviates from the key characteristic requirement, a position, to which the end surface 13U of the corresponding upper wing-fuselage coupling fitting 7U is to be coupled, on the joint surface 14U of the center wing main body 6 is corrected. Similarly, when it is determined that at least one of the predicted profiles of the lower surfaces 12L of the lower wing-fuselage coupling fittings 7L deviates from the key characteristic requirement, a position, on which the end surface 13L of the corresponding lower wing-fuselage coupling fitting 7L is to be coupled, on the joint surface 14L of the center wing main body 6 is corrected.

Figure 11:
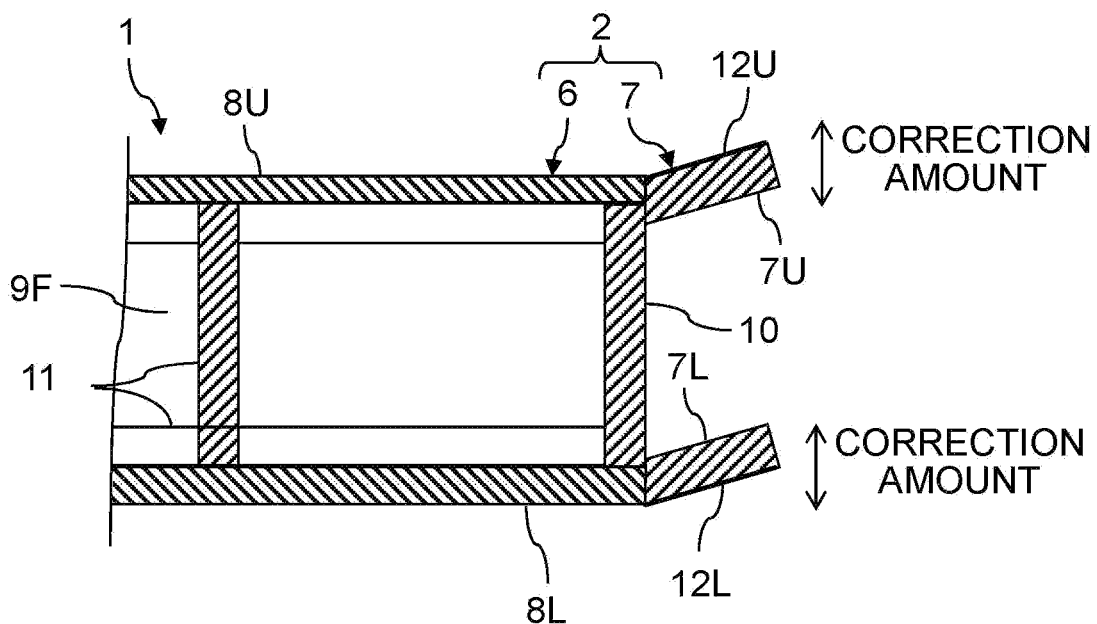
FIG. 11 shows an example of correcting the coupling positions of the upper wing-fuselage coupling fitting and the lower wing-fuselage coupling fitting shown in FIG. 3 to the center wing main body by moving the coupling positions in parallel.

FIG. 11 shows an example of correcting the coupling positions of the upper wing-fuselage coupling fitting 7U and the lower wing-fuselage coupling fitting 7L shown in FIG. 3 to the center wing main body 6 by moving the coupling positions in parallel.

As shown in FIG. 11, the mounting positions of the upper wing-fuselage coupling fittings 7U and the lower wing-fuselage coupling fittings 7L to the center wing main body 6 can be finely adjusted by moving the mounting positions in parallel respectively. The adjustment directions of the mounting positions of the upper wing-fuselage coupling fittings 7U and the lower wing-fuselage coupling fittings 7L are not limited to the upper and lower direction of the aircraft 3 as shown in FIG. 11, but may also be the front and rear direction.

Each of the correction amounts of the mounting positions of the upper wing-fuselage coupling fittings 7U and the lower wing-fuselage coupling fittings 7L can be determined by a desired determination method depending on requirements for the center wing 2. As a typical specific example, the correction amounts of the mounting positions of the upper wing-fuselage coupling fittings 7U and the lower wing-fuselage coupling fittings 7L can be determined so that the errors of the predicted profiles of the upper surfaces 12U of the upper wing-fuselage coupling fittings 7U from nominal values and the errors of the predicted profiles of the lower surfaces 12L of the lower wing-fuselage coupling fittings 7L from nominal values may be minimized respectively. In this case, each of the mounting positions and the correction amounts of the mounting positions of the upper wing-fuselage coupling fittings 7U and the lower wing-fuselage coupling fittings 7L can be determined by an optimization calculation, a least square method or the like for determining a value of a parameter consisting of the mounting position or the correction amount of the mounting position so that the errors, from the nominal values, of the predicted profile consisting of point group data may be minimized.

As another specific example, the correction amounts may also be determined to be the minimum values when the errors of the predicted profiles of the upper surfaces 12U of the upper wing-fuselage coupling fittings 7U and the errors of the predicted profiles of the lower surfaces 12L of the lower wing-fuselage coupling fittings 7L are each within an allowable range. That is, the correction amounts of the mounting positions of the upper wing-fuselage coupling fittings 7U and the lower wing-fuselage coupling fittings 7L can also be determined so that each of the shift amounts of the mounting positions may be as small as possible.

In this case, it is appropriate to set an allowable range of errors narrower than an allowable range of errors defined as the key characteristic requirement to determine the correction amounts of the mounting positions of the upper wing-fuselage coupling fittings 7U and the lower wing-fuselage coupling fittings 7L since the predicted profiles of the upper surfaces 12U of the upper wing-fuselage coupling fittings 7U and the predicted profiles of the lower surfaces 12L of the lower wing-fuselage coupling fittings 7L do not necessarily match the actual profiles after assembling the center wing 2. That is, it is appropriate to determine the correction amounts of the mounting positions of the upper wing-fuselage coupling fittings 7U and the lower wing-fuselage coupling fittings 7L with setting a margin for the allowable range of errors defined as the key characteristic requirement.

Figure 12:
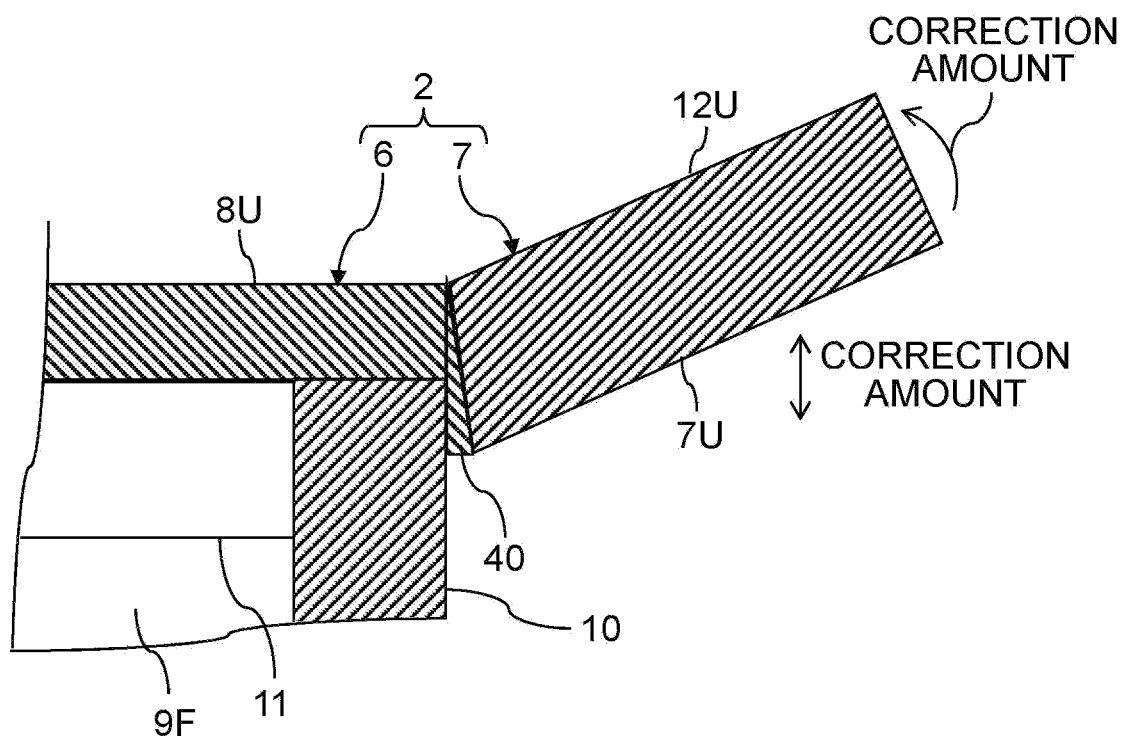
FIG. 12 shows an example of correcting the coupling position of the upper wing-fuselage coupling fitting shown in FIG. 3 to the center wing main body with adjusting the mounting angle of the upper wing-fuselage coupling fitting.

FIG. 12 shows an example of correcting the coupling position of the upper wing-fuselage coupling fitting 7U shown in FIG. 3 to the center wing main body 6 with adjusting the mounting angle of the upper wing-fuselage coupling fitting 7U.

As illustrated in FIG. 12, coupling the upper wing-fuselage coupling fitting 7U to the joint surface 14U of the center wing main body 6 with a plate-shaped shim 40 having a generally wedge-shaped cross section sandwiched therebetween allows finely adjusting the mounting angle of the upper wing-fuselage coupling fitting 7U to the center wing main body 6. That is, the end surface 13U of the upper wing-fuselage coupling fitting 7U can be slanted to be coupled to the joint surface 14U of the central wing main body 6.

Accordingly, correction may be made by disposing the shim 40 having an appropriate shape between the upper wing-fuselage coupling fitting 7U and the joint surface 14U of the central wing main body 6 in a case where the profile of the upper surface 12U cannot satisfy the key characteristic requirement simply by moving the mounting position of the upper wing-fuselage coupling fitting 7U to the central wing main body 6 in parallel as shown in FIG. 11, a case where it is preferable to bring the predicted profile of the upper surface 12U closer to the nominal values, or the like. That is, the coupling position may be corrected including the mounting angle of the upper wing-fuselage coupling fitting 7U to the central wing main body 6. As a matter of course, the same applies to the correction of the mounting position of each of the lower wing-fuselage coupling fittings 7L.

In that case, it is determined whether the wedge-shaped shim 40 whose thickness decreases in one direction should be sandwiched between the third surface of the second component and the first surface of the first component in order to couple the third surface to the first surface, based on the predicted profile of the second surface of the second component, in the determination of the correction amount of the coupling position of the second component in step S6. That is, it is determined whether an angle correction amount should be included in the correction amount of the coupling position of the second component.

When it has been determined that the wedge-shaped shim 40 should be sandwiched between the third surface of the second component and the first surface of the first component in order to couple the third surface to the first surface, i.e, it has been determined that the mounting angle of the second component should be corrected, the correction amount of the mounting angle of the second component and the shape of the shim 40 corresponding to the correction amount of the mounting angle are determined. Thereby, it becomes possible to adjust the coupling position including the mounting angle of the second component.

When the correction amount of the coupling position of the second component has been determined, the coupling position of the second component is fixed. On the other hand, when it has been determined that the predicted profile of the second surface of the second component does not deviate from the key characteristic requirement regarding the contour degree, in the determination in step S5, the coupling position of the second component can be fixed without correction. That is, the initial coupling position of the second component can be determined to be the actual coupling position.

Note that, even when the predicted profile of the second surface of the second component does not deviate from the key characteristic requirement regarding the contour degree, correcting the coupling position of the second component sometimes allows improving the degree of contour of the second surface having the key characteristic. Therefore, although FIG. 1 shows an example of a flow for correcting the coupling position of the second component to the first component only when it has been determined that the predicted profile of the second surface of the second component deviates from the key characteristic requirement regarding the contour degree, from the viewpoint of avoiding increase in the production cost and production period of the structure 1, another criterion may be set to correct the coupling position of the second component to the first component when quality improvement is important.

Once the coupling position of the second component to the first component has been determined, the third surface of the second component is coupled to the first surface of the first component at the determined coupling position in step S7. Therefore, when the coupling position of the second component has been corrected in step S6, the third surface of the second component is coupled to the first surface of the first component at a coupling position different from that at the time of design.

When it has been determined to interpose the shim 40 whose thickness decreases in one direction between the third surface of the second component and the first surface of the first component to couple the third surface to the first surface as illustrated in FIG. 12, the third surface of the second component is coupled to the first surface of the first component with the shim 40 whose thickness decreases in one direction interposed therebetween.

When the structure 1 is the center wing 2 as shown in (C) of FIG. 5, the central wing 2 is assembled by coupling the upper wing-fuselage coupling fittings 7U and the lower wing-fuselage coupling fittings 7L to the central wing main body 6 as shown in (B) of FIG. 5. The upper wing-fuselage coupling fittings 7U and the lower wing-fuselage coupling fittings 7L are coupled to the center wing main body 6 at coupling positions each of which is corrected as illustrated in FIGS. 11 and 12, as necessary.

Next, in step S8, the profile of the second surface, having the key characteristic, of the second component after coupling the third surface of the second component to the first surface of the first component, i.e., after the structure 1 has been assembled is measured with a three-dimensional measuring machine. This is because confirming actual profile of the surface, having the key characteristic regarding the degree of contour, after the assembly using a three-dimensional measuring machine is usually defined as a work procedure.

The actual profile of the second surface, having the key characteristic, of the second component can be utilized as reference data for assembling the next structure 1. Specifically, in step S9, the profile, predicted in step S4, of the second surface of the second component before assembling the structure 1 can be compared to the actual profile, measured in step S8, of the second surface of the second component after assembling the structure 1. In this case, it becomes possible to evaluate the prediction accuracy of the profile of the second surface of the second component in step S4.

When it is desired to improve the prediction accuracy of the profile of the second surface of the second component, at least one condition used to predict the profile of the second surface of the second component in step S4 can be changed so that an index value, such as an MSE (mean squared error), representing the differences between the predicted values of the profile of the second surface of the second component and the measured values of the profile of the second surface of the second component may decrease.

A condition for predicting the profile of the second surface of the second component can be changed by changing a value of at least one parameter included in an algorithm used to predict the profile. Specifically, when the profile of the second surface of the second component is predicted using FEM analysis, it is possible to set at least one weight coefficient, which gives weight to a desired parameter in the FEM analysis, and to optimize the at least one weight coefficient so that the index value representing an amount of deviation between the predicted values and the measured values of the profile may decrease. On the other hand, when the profile of the second surface of the second component is predicted using a neural network, at least one parameter value of the neural network can be optimized so as to improve the prediction accuracy.

Thereby, it becomes possible to predict the profile of the second surface of the second component under the at least one changed condition in case of assembling another structure 1 according to the flow shown in FIG. 1. That is, before coupling the third surface of the second component to the first surface of the first component, the profile of the second surface of the second component in a case where the third surface of the second component is coupled to the first surface of the first component can be predicted with higher accuracy.

As described above, in the method of producing the structure 1, a deviation from the key characteristic requirement regarding the contour degree, which may arise after assembling components, is detected before assembling the components, and then the components are assembled while correcting the mounting positions of the components so as to meet the key characteristic requirement.

Effects

Therefore, according to the method of producing the structure 1, it is possible to prevent a problem that a portion of a component having a key characteristic deviates from a requirement regarding the contour degree after an assembly of components is completed. That is, the requirement regarding the contour degree can be reliably satisfied after the assembly of the components is completed. As a result, it is possible to avoid large-scale repair of the structure 1 due to failure to satisfy the key characteristic requirement regarding the contour degree.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of producing a structure including a first component and a second component,
   the first component having a first surface, the first component including subcomponents,
   the second component having a second surface and a third surface, a predetermined contour degree being required for the second surface,
   the structure being assembled by coupling the third surface of the second component to the first surface of the first component after assembling the first component by coupling the subcomponents to each other, the structure being an aircraft, an aircraft component, a spacecraft or a spacecraft component,
   the method comprising:
   measuring profiles of the second and third surfaces of the second component which has not been coupled to the first component;
   measuring a profile of at least one fourth surface of the subcomponents which has not been coupled to each other, the first surface being to be formed by the at least one fourth surface;
   measuring a profile of at least one fifth surface of the subcomponents which has not been coupled to each other, the at least one fifth surface being determined as a surface which influences a profile of the first surface of the first component after coupling the subcomponents;
   physically assembling the first component by coupling the subcomponents with adjustment including at least one of load application and position adjustment carried out prior to completion of the physical assembly of the first component;
   recording data representing the adjustment carried out prior to completion of the physical assembly of the first component;
   estimating a changed profile of the second surface of the second component in a case of coupling the third surface of the second component to the first surface of the assembled first component, the changed profile of the second surface being estimated based on the measured profiles of the second to fifth surfaces and the recorded data representing the adjustment carried out in conjunction with the physical assembly of the first component, the changed profile of the second surface being estimated before coupling the second component to the assembled first component;

determining a coupling position of the third surface of the second component to the first surface of the first component based on the estimated changed profile of the second surface; and coupling the third surface of the second component to the first surface of the first component at the determined coupling position.

2. The method of producing the structure according to claim 1, wherein, when it has been determined that the estimated changed profile of the second surface deviates from the predetermined contour degree, the coupling position of the third surface of the second component is determined by determining an amount of correction from an initially planned coupling position so that an actual changed profile of the second surface after the third surface of the second component has actually been coupled to the first surface of the first component satisfies the predetermined contour degree.

3. The method of producing the structure according to claim 2, wherein the determining the coupling position includes:
determining whether a shim of which thickness decreases in one direction should be interposed between the first surface of the first component and the third surface of the second component in order to couple the third surface to the first surface, based on the estimated changed profile of the second surface; and the coupling the third surface to the first surface includes:
interposing the shim between the first surface and the third surface when it has been determined that the shim should be interposed between the first surface and the third surface in order to couple the third surface to the first surface.

4. The method of producing the structure according to claim 3, further comprising:
measuring an actual changed profile of the second surface after the third surface of the second component has actually been coupled to the first surface of the first component; and changing a condition used for estimating the changed profile of the second surface so that an index value representing a difference between the estimated changed profile of the second surface and the measured actual changed profile of the second surface decreases, wherein another structure is assembled by coupling a third surface of a second component of the another structure to a first surface of a first component of the another structure after assembling the first component of the another structure by coupling subcomponents of the first component of the another structure to each other, and a changed profile of a second surface of the second component of the another structure in a case of coupling the third surface of the second component of the another structure to the first surface of the assembled first component of the another structure is estimated under the changed condition, before coupling the second component of the another structure to the assembled first component of the another structure.

5. The method of producing the structure according to claim 4, wherein the changed profile of the second surface is estimated by a finite element method analysis or using a neural network, and the changed condition includes a value of a parameter in the finite element method analysis or the neural network.

6. The method of producing the structure according to claim 2, further comprising:
measuring an actual changed profile of the second surface after the third surface of the second component has actually been coupled to the first surface of the first component; and changing a condition used for estimating the changed profile of the second surface so that an index value representing a difference between the estimated changed profile of the second surface and the measured actual changed profile of the second surface decreases, wherein another structure is assembled by coupling a third surface of a second component of the another structure to a first surface of a first component of the another structure after assembling the first component of the another structure by coupling subcomponents of the first component of the another structure to each other, and a changed profile of a second surface of the second component of the another structure in a case of coupling the third surface of the second component of the another structure to the first surface of the assembled first component of the another structure is estimated under the changed condition, before coupling the second component of the another structure to the assembled first component of the another structure.

7. The method of producing the structure according to claim 6, wherein the changed profile of the second surface is estimated by a finite element method analysis or using a neural network, and the changed condition includes a value of a parameter in the finite element method analysis or the neural network.

8. The method of producing the structure according to claim 1, wherein the determining the coupling position includes:
determining whether a shim of which thickness decreases in one direction should be interposed between the first surface of the first component and the third surface of the second component in order to couple the third surface to the first surface, based on the estimated changed profile of the second surface; and the coupling the third surface to the first surface includes:
interposing the shim between the first surface and the third surface when it has been determined that the shim should be interposed between the first surface and the third surface in order to couple the third surface to the first surface.

9. The method of producing the structure according to claim 8, further comprising:
measuring an actual changed profile of the second surface after the third surface of the second component has actually been coupled to the first surface of the first component; and changing a condition used for estimating the changed profile of the second surface so that an index value representing a difference between the estimated changed profile of the second surface and the measured actual changed profile of the second surface decreases, wherein another structure is assembled by coupling a third surface of a second component of the another structure to a first surface of a first component of the another structure after assembling the first component of the another structure by coupling subcomponents of the first component of the another structure to each other, and a changed profile of a second surface of the second component of the another structure in a case of coupling the third surface of the second component of the another structure to the first surface of the assembled first component of the another structure is estimated under the changed condition, before coupling the second component of the another structure to the assembled first component of the another structure.

10. The method of producing the structure according to claim 9,
wherein the changed profile of the second surface is estimated by a finite element method analysis or using a neural network, and
the changed condition includes a value of a parameter in the finite element method analysis or the neural network.

11. The method of producing the structure according to claim 1,
further comprising:
measuring an actual changed profile of the second surface after the third surface of the second component has actually been coupled to the first surface of the first component; and
changing a condition used for estimating the changed profile of the second surface so that an index value representing a difference between the estimated changed profile of the second surface and the measured actual changed profile of the second surface decreases,
wherein another structure is assembled by coupling a third surface of a second component of the another structure to a first surface of a first component of the another structure after assembling the first component of the another structure by coupling subcomponents of the first component of the another structure to each other, and
a changed profile of a second surface of the second component of the another structure in a case of coupling the third surface of the second component of the another structure to the first surface of the assembled first component of the another structure is estimated under the changed condition, before coupling the second component of the another structure to the assembled first component of the another structure.

12. The method of producing the structure according to claim 11,
wherein the changed profile of the second surface is estimated by a finite element method analysis or using a neural network, and
the changed condition includes a value of a parameter in the finite element method analysis or the neural network.

13. The method of producing the structure according to claim 1, wherein the adjustment includes the application of a load to the subcomponent having the fifth surface prior to completion of the assembly of the subcomponents of the first component, and wherein the recorded data includes recorded load data.

14. The method of producing the structure according to claim 1, wherein the adjustment includes a resting of the subcomponent having the fifth surface on an assembly jig and shifting a position of the subcomponent having the fifth surface relative to the assembly jig, and wherein the recorded data includes data representing an amount of the positional adjustment of the subcomponent having the fifth surface.

15. The method of producing the structure according to claim 14, wherein the adjustment includes extending an alignment pin though a hole in the subcomponent having the fifth surface and shifting a relationship between the pin and the subcomponent having the fifth surface from a less accurate to a more accurate predetermined spatial relationship.

16. A method of producing a structure including a first component and a second component,
the first component having a first surface, the first component including subcomponents,
the second component having a second surface and a third surface, a predetermined contour degree being required for the second surface,
the structure being assembled by coupling the third surface of the second component to the first surface of the first component after assembling the first component by coupling the subcomponents to each other, the structure being an aircraft, an aircraft component, a spacecraft or a spacecraft component,
the method comprising:
measuring profiles of the second and third surfaces of the second component which has not been coupled to the first component;
measuring a profile of at least one fourth surface of the subcomponents which has not been coupled to each other, the first surface being to be formed by the at least one fourth surface;
measuring a profile of at least one fifth surface of the subcomponents which has not been coupled to each other, the at least one fifth surface being determined as a surface which influences a profile of the first surface of the first component after coupling the subcomponents;
assembling the first component by coupling the subcomponents with adjustment including at least one of load application and position adjustment;
recording data representing the adjustment;
estimating a changed profile of the second surface of the second component in a case of coupling the third surface of the second component to the first surface of the assembled first component, the changed profile of the second surface being estimated based on the measured profiles of the second to fifth surfaces and the recorded data representing the, the changed profile of the second surface being estimated before coupling the second component to the assembled first component;
determining a coupling position of the third surface of the second component to the first surface of the first component based on the estimated changed profile of the second surface; and
coupling the third surface of the second component to the first surface of the first component at the determined coupling position, the method further comprising;
measuring an actual changed profile of the second surface after the third surface of the second component has actually been coupled to the first surface of the first component; and
changing a condition used for estimating the changed profile of the second surface so that an index value representing a difference between the estimated changed profile of the second surface and the measured actual changed profile of the second surface decreases, wherein another structure is assembled by coupling a third surface of a second component of the another structure to a first surface of a first component of the another structure after assembling the first component of the another structure by coupling subcomponents of the first component of the another structure to each other, and a changed profile of a second surface of the second component of the another structure in a case of coupling the third surface of the second component of the another structure to the first surface of the assembled first component of the another structure is estimated under the changed condition, before coupling the second component of the another structure to the assembled first component of the another structure, the method still further comprising;

measuring an actual changed profile of the second surface after the third surface of the second component has actually been coupled to the first surface of the first component; and changing a condition used for estimating the changed profile of the second surface so that an index value representing a difference between the estimated changed profile of the second surface and the measured actual changed profile of the second surface decreases, wherein another structure is assembled by coupling a third surface of a second component of the another structure to a first surface of a first component of the another structure after assembling the first component of the another structure by coupling subcomponents of the first component of the another structure to each other, and a changed profile of a second surface of the second component of the another structure in a case of coupling the third surface of the second component of the another structure to the first surface of the assembled first component of the another structure is estimated under the changed condition, before coupling the second component of the another structure to the assembled first component of the another structure.

17. The method of producing the structure according to claim 16,
wherein the determining the coupling position includes:
determining whether a shim of which thickness decreases in one direction should be interposed between the first surface of the first component and the third surface of the second component in order to couple the third surface to the first surface, based on the estimated changed profile of the second surface; and
the coupling the third surface to the first surface includes:
interposing the shim between the first surface and the third surface when it has been determined that the shim should be interposed between the first surface and the third surface in order to couple the third surface to the first surface.

18. The method of producing the structure according to claim 16, wherein the adjustment includes the application of a load to the subcomponent having the fifth surface prior to completion of the assembly of the subcomponents of the first component, and wherein the recorded data includes recorded load data.

19. The method of producing the structure according to claim 16, wherein the adjustment includes a resting of the subcomponent having the fifth surface on an assembly jig and shifting a position of the subcomponent having the fifth surface relative to the assembly jig, and wherein the recorded data includes data representing an amount of the positional adjustment of the subcomponent having the fifth surface relative to the assembly jig.

20. The method of producing the structure according to claim 19, wherein the adjustment includes extending an alignment pin though a hole in the subcomponent having the fifth surface and shifting a relationship between the pin and the subcomponent having the fifth surface from a less accurate to a more accurate predetermined spatial relationship.

* * * * *